United States Patent
Murdock (10) Patent No.: US 6,877,437 B2
(45) Date of Patent: Apr. 12, 2005

(54) AUTOMOBILE TURNTABLE

(76) Inventor: John Murdock, 200 E. Dutton Mill Rd., Aston, PA (US) 19014

(*) Notice: Subject to any disclaimer, the term of this patent is extended or adjusted under 35 U.S.C. 154(b) by 0 days.

(21) Appl. No.: 10/656,430

(22) Filed: Sep. 5, 2003

(65) Prior Publication Data

US 2005/0051046 A1 Mar. 10, 2005

(51) Int. Cl.⁷ .............................. B61C 3/00
(52) U.S. Cl. ........................................ 104/35
(58) Field of Search ..................... 104/35, 36, 37, 104/44

(56) References Cited

U.S. PATENT DOCUMENTS

| | | | |
|---|---|---|---|
| 2,952,221 A | 9/1960 | Hobel | |
| 3,566,798 A | 3/1971 | Peitzman | |
| 3,566,799 A | 3/1971 | Stern | |
| 3,685,079 A | 8/1972 | Dawson | |
| 3,728,971 A | 4/1973 | Merrick | |
| 3,898,935 A | 8/1975 | Norlie | |
| 4,608,929 A | 9/1986 | Park | |
| 4,716,837 A | 1/1988 | Valencia | |
| 4,750,428 A | 6/1988 | Hyte | |
| 4,753,173 A * | 6/1988 | James | 104/45 |
| 4,777,884 A | 10/1988 | Seay | |
| 5,086,704 A | 2/1992 | Mueller | |
| 5,400,550 A * | 3/1995 | Beasley | 52/65 |
| 5,626,079 A | 5/1997 | Summers | |
| 5,676,601 A * | 10/1997 | Saunders | 472/29 |
| 5,755,160 A | 5/1998 | Blufordcraving | |
| 6,382,106 B1 | 5/2002 | Knight | |
| 6,470,807 B2 | 10/2002 | Warner | |
| 6,672,221 B2 * | 1/2004 | Hadley | 104/35 |
| 6,745,699 B2 * | 6/2004 | Hill | 104/35 |
| 2003/0056682 A1 | 3/2003 | Hill | |
| 2003/0101894 A1 | 6/2003 | Schwenker | |

* cited by examiner

Primary Examiner—S. Joseph Morano
Assistant Examiner—Robert J. McCarry, Jr.
(74) Attorney, Agent, or Firm—Robert J. Yarbrough (57) ABSTRACT

The Invention is a modular, flexible automobile turntable for installation on an uneven surface such as a residential driveway. A flexible track conforms to the surface of the driveway. A turntable deck is mounted for rotation on the track, the deck comprising a central disk driven by a hydraulic gear motor and a plurality of flexible petals extending radially from the center disk.

14 Claims, 14 Drawing Sheets

AUTOMOBILE TURNTABLE

BACKGROUND OF THE INVENTION

1. Field of the Invention

The Invention is an automobile turntable. The turntable is flexible to allow the turntable to conform to uneven surfaces, such as the surface of a residential driveway, and is modular for ease of transportation and assembly. The rotational force rotating the turntable is user-adjustable for safe operation.

2. Description of the Related Art

Turntables are well known for changing the orientation of an object in a limited amount of space. Automobile turntables are particularly useful for changing the direction of an automobile to allow access to a garage or to allow easier entry or exit to or from a driveway. Turntables have other uses, such as the display of goods for sale.

A modular design allows an automobile turntable to be divided into several components of manageable size so that the turntable components may be transported and installed with relative ease. A flexible design allows an automobile turntable to conform to an uneven surface on which the turntable is installed, such as the surface of a real-world driveway, complete with all of the pits, bumps and changes of contour present on a macadam surface. A turntable for which the rotational force may be adjusted allows the user to select a force that is adequate to rotate the turntable and the automobile for which the turntable will be used but that is low enough that any obstacle encountered by the rotating automobile will stop the rotation, preventing damage.

SUMMARY OF THE INVENTION

The present Invention is a flexible, modular automobile turntable. The turntable comprises a user-adjustable drive system, a turntable deck rotated by the drive system and a circular track supporting the deck.

The user-adjustable drive system comprises a hydraulic pump for which the maximum pressure may be selected by the user. The hydraulic pump drives a hydraulic gear motor that rotates the turntable deck. The pressure set by the user determines the maximum torque exerted by the hydraulic gear motor and hence by the turntable deck.

The flexible nature of the turntable stems from the structure of the circular track on which the deck rotates and the structure of the turntable deck. The circular track rests on the surface of the driveway or other surface and conforms generally to the contours of the surface. The horizontal location of the track on the surface is determined by pairs of bars attached to a base, each pair of bars and the base defining a triangle.

The deck comprises a center disk and several trapezoidal petals attached to and extending radially from the center disk. The outer portion of each petal is supported by outer rollers riding on the track. Each petal has two radial edges. The first radial edge is formed with a reinforcing flange depending from the upper surface of the petal. A roller is mounted adjacent to the reinforcing flange and supports the reinforcing flange and first radial edge. The second radial edge of each petal is coplanar with the upper surface of the petal and has no radial flange. The second radial edge of each petal overlaps and is supported by the first radial edge of the adjoining petal.

The flange depending from the first radial edge acts as a structural reinforcement for the first radial edge of the petal, rendering the reinforced portion of the first radial edge of the petal substantially rigid in the radial direction. When several petals are joined together to form the deck, the reinforcing flanges radiate from the center disk. The second radial edge of each petal overlaps and is supported by the reinforced first radial edge of the adjoining petal. The use of the reinforcing flange allows the petals to be formed of a material that otherwise would not be strong enough in flexure to support reliably the weight of an automobile. The combined strength of the reinforcing flanges on the first radial edge of all of the petals allows the deck to support reliably the required weight.

The connection between each petal and the center disk is flexible in the vertical direction. As the turntable rotates, the reinforced first radial edge of each petal is able to rise and fall as each outer roller follows the contours of the track, which in turn follows the contours of the driveway or other surface on which the turntable is installed. The outer end of each petal also is able to twist with respect to the inner end of the petal. As a result, as the turntable rotates the first radial edge of each petal is able to rise and fall in a manner operatively independent of the motion of the other petals, each petal conforming to the contours of the track supporting that petal.

The turntable of the Invention is modular, with the deck, base and track separating into several component parts. The division of the Invention into several component parts allows the turntable to be moved and installed readily by a homeowner without the need for special equipment or skill. The turntable is particularly suited to being marketed and purchased in kit form.

DESCRIPTION OF AN EMBODIMENT

Figure 1:
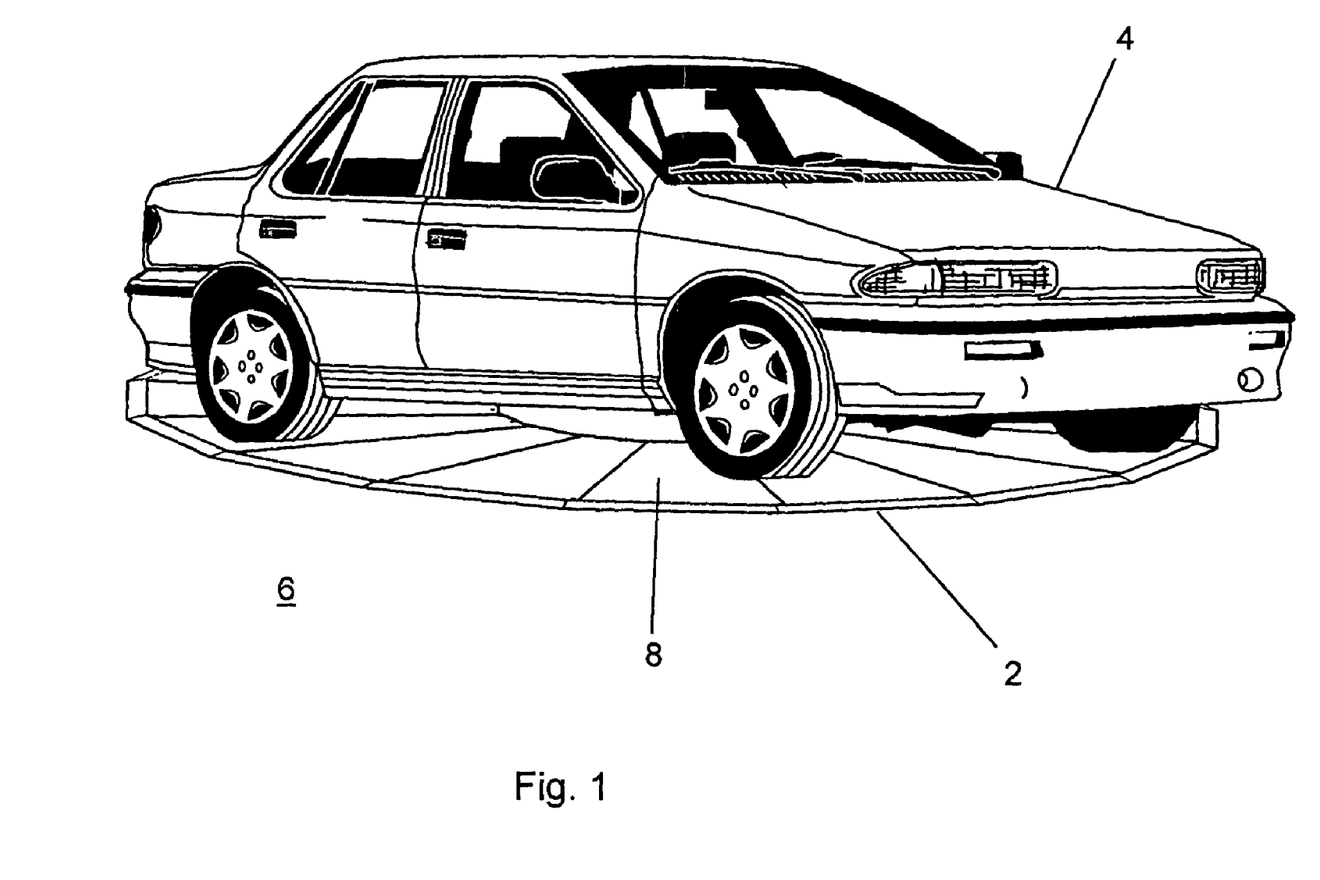
FIG. 1 is a perspective view of the turntable.

As illustrated by FIG. 1, the Invention is a turntable 2 for rotating an automobile 4 in confined space. The turntable 2 mounts on a surface 6, which may be an uneven surface 6 such as a residential driveway. To allow the turntable 2 to operate on a residential driveway that is uneven, sloping and generally not flat, the turntable 2 is flexible and conforms generally to the contours of the driveway surface 6, yet is strong enough to support the weight of a heavy automobile 4. Flexibility is achieved through the structure of the turntable deck 8 and track 10 (FIG. 3) on which the turntable deck 8 rides.

Figure 2:
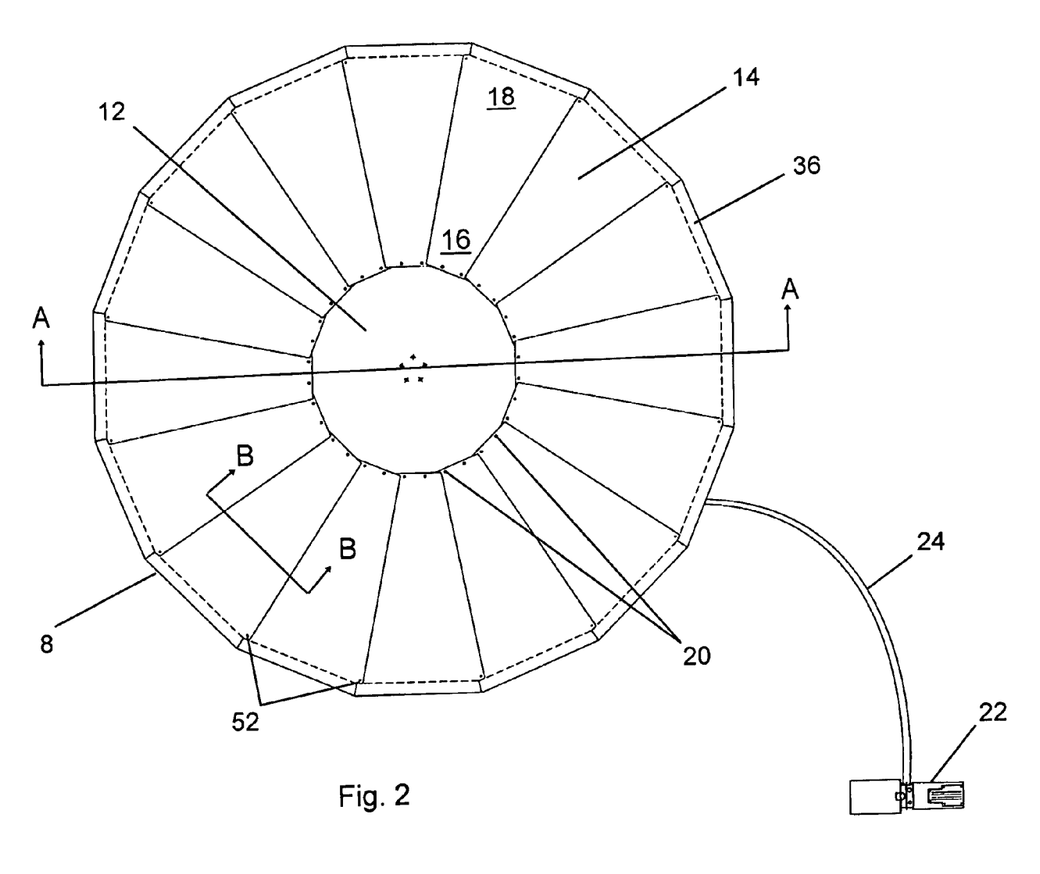
FIG. 2 is a plan view of the turntable.

FIG. 2 is a plan view of the turntable deck 8. The turntable deck 8 includes a center disk 12 and a plurality of petals 14, preferably sixteen petals 14, although any suitable number of petals 14 may be used. The center disk 12 is generally circular. Alternatively, the center disk 12 may be a polygon with the number of sides of the polygon equal to the number of petals 14. Each petal 14 has an inner end 16 and an outer end 18. The inner end 16 of each petal 14 is attached to the center disk 12 by two bolts 20. Alternatively, any suitable means for fastening the petals 14 to the center disk 12 may be employed, such as rivets, pins, welding, adhesives or any other suitable method.

Motive power for the turntable 2 is provided by a hydraulic pump 22. Any suitable pump 22 may be used, but a pump having a user-selectable maximum pressure up to 1500 psi is preferred. A pump 22 that has proven acceptable is the KTI pump model 3176 available from Kraft Fluid Systems, 14300 Foltz Industrial Highway, Cleveland Ohio, 44136. The pump 22 is electrically powered and may be activated by any of the means known in the art, including a radio or infrared remote control or by a mechanical switch. The pump 22 control may be of the 'dead man' type, with the pump 22 energized only when pressure is applied by an operator to a switch or remote control button. The pump 22 control may be protected, as by a code, to prevent operation of the pump 22 by unauthorized persons.

Figure 3:
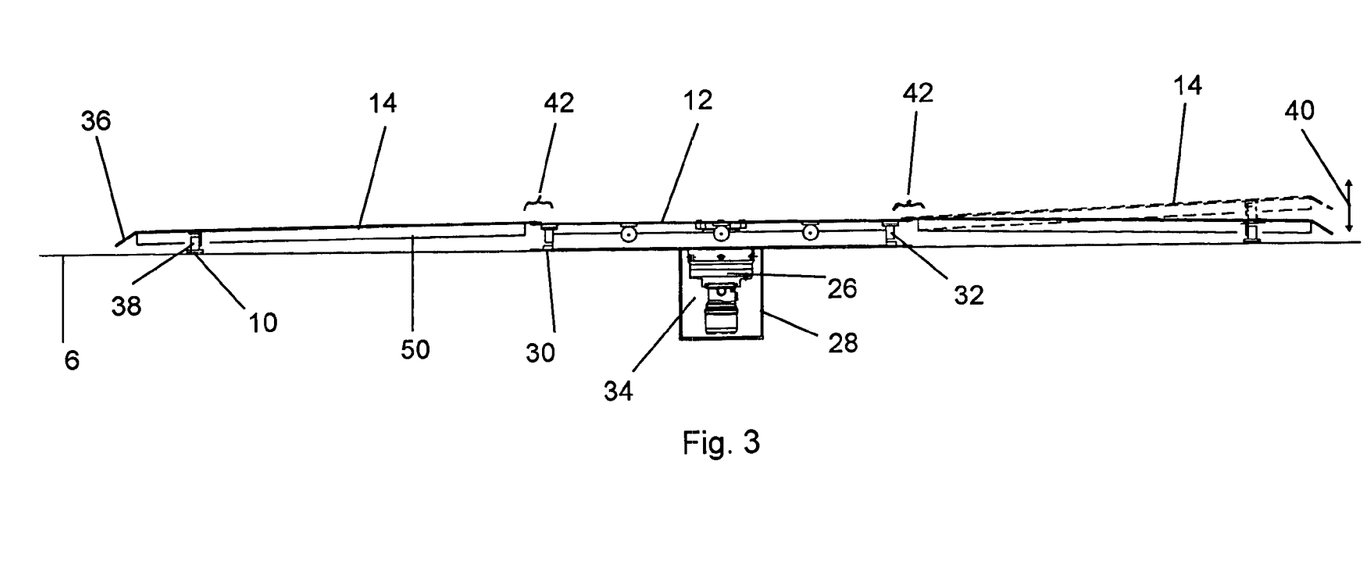
FIG. 3 is section A—A from FIG. 2.

Hydraulic lines 24 carry pressurized hydraulic fluid to a hydraulic gear motor 26 shown by FIG. 3. Any suitable conventional hydraulic gear motor may be used. Hydraulic gear motor 26 should be capable of producing 30,000 inch-pounds of torque at 2 rpm at the output shaft of a five to one reduction gearbox at a hydraulic input pressure of 1500 psi.

Figure 4:
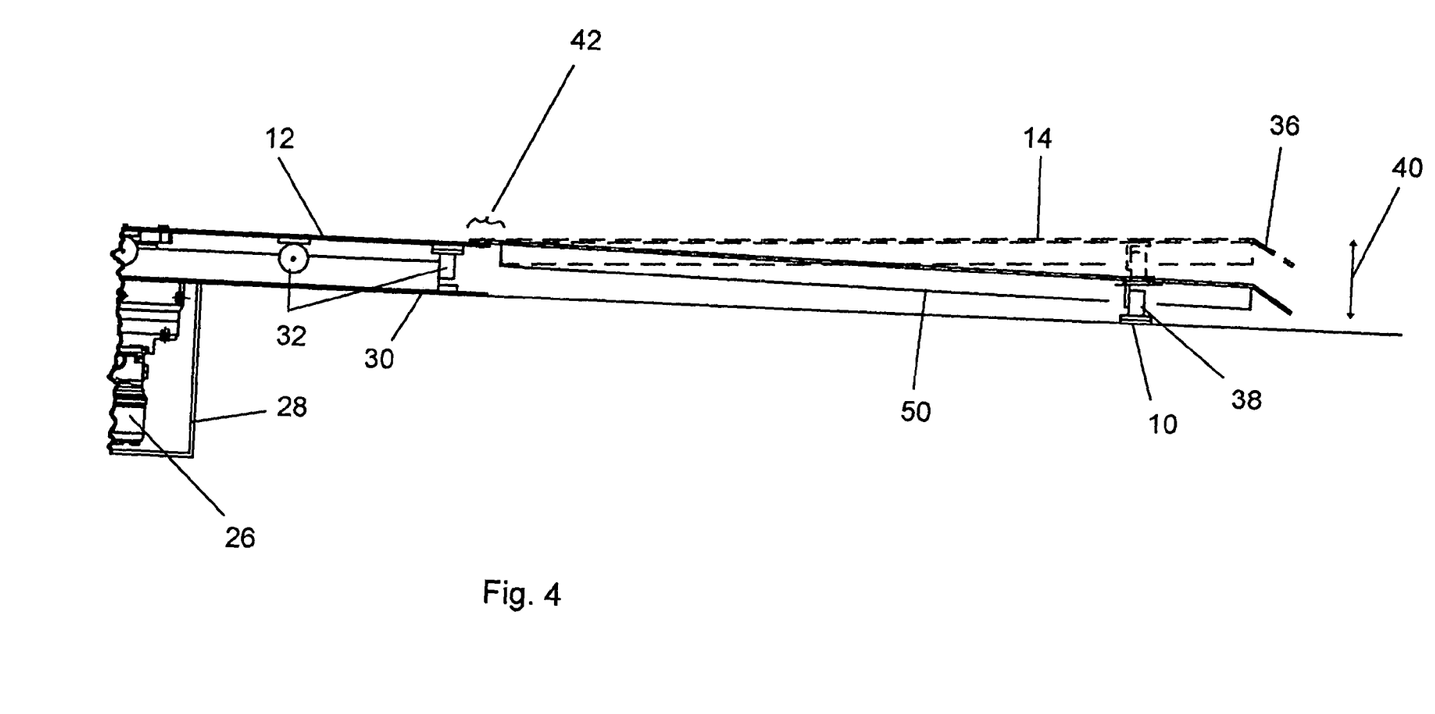
FIG. 4 is a detail of section A—A from FIG. 2.

FIG. 3 is cross section A—A from FIG. 2 and FIG. 4 is a detail of section A—A from FIG. 2. The hydraulic gear motor 26 is inset below the surface 6 of the driveway and is housed in a suitable motor enclosure 28. The motor enclosure 28 generally is a cube with each side approximately ten inches long. An excavation is made through the driveway surface 6 to receive the hydraulic gear motor 26 and the motor enclosure 28. The motor enclosure 28 is secured in the excavation by cement. Such an excavation through a macadam driveway may be readily achieved by a homeowner. The motor enclosure 28 is attached to a turntable base 30 the lower surface of which is flush with the surface 6 of the driveway. The turntable base 30 supports inner rollers 32. The inner rollers 32 in turn support the center disk 12 so that the center disk 12 may rotate above the turntable base 30.

Hydraulic gear motor 26 penetrates the base 30 and is bolted to the center disk 12, allowing the center disk 12 to be selectably rotated by the hydraulic gear motor 26. Hydraulic gear motor 26 is protected from moisture in motor enclosure 28 by paraffin wax 34. Paraffin wax 34 is poured in a molten state and solidifies to fill motor enclosure 28, excluding moisture and protecting hydraulic gear motor 26. Paraffin wax 34 having a melting point of 130° F. has proven to be satisfactory in this application.

The base 30, motor enclosure 28 and hydraulic gear motor 26 serve to anchor the turntable 2 laterally so that the turntable 2 does not move in the lateral direction as, for example, in response to a load presented by an off-center automobile 4 or when the turntable 2 is mounted on a sloping driveway. The arrangement of a buried motor enclosure 28 anchored in cement and hydraulic gear motor 26 attached to the center disk 12 has proven to be highly resistant to lateral movement resulting from lateral impacts, as for example, the impact of automobile 4 tires striking the turntable deck 8 as an automobile 4 drives onto the deck 8.

Petals 14 are attached to the center disk 12 and radiate outward from the center disk 12. Together, the petals 14 and center disk 12 form the turntable deck 8. The outer end 18 of each petal 14 is formed into a lip 36 to ease entry and exit of an automobile 4 onto and from the turntable 2. The lip 36 also serves to prevent bending of the outer edge of petal 14 when the petal 14 is struck by an automobile 4 tire. Forming lip 36 with an angle of 90° to the surface of petal 14 provides maximum strength to prevent bending; however, such a lip 36 has been found to increase the lateral impact of an automobile 4 tire on the deck 8. Forming lip 36 with an angle of approximately 30° has been found to suitably strengthen lip 36 to prevent bending and to prevent inordinate impact from an automobile 4 tire.

The turntable deck 8 at the lip 36 is approximately two inches above the surface 6 of the driveway. The turntable deck 8 at the center disk 12 is approximately three inches above the surface 6 of the driveway. The higher center disk 12 promotes water drainage and provides the user with tactile feedback that an automobile 4 is properly positioned on the turntable 2.

As shown by FIG. 3, the outer end 18 of each petal 14 is supported by an outer roller 38 rotatably mounted to the petal 14. The outer roller 38 is supported by and rolls on a track 10. While any suitable roller may be used for the outer rollers 38, model number CR26UU cam followers having a 1⅝ inch cylinder and a ⅝ inch shank manufactured by Nippon-Thompson, Ltd. (IKO Bearings) and available from Master-Carr, P.O. Box 440 of New Brunswick, N.J. 08903 have proven to be suitable. The track 10 conforms generally to the contours of the driveway and bridges local bumps and depressions.

Each petal 14 is flexible in the vertical direction 40 about the attachment to the center disk 12 due to the structure of the petals 14. Each petal 14 is formed from a single piece of a relatively thin, strong material. While any suitable material and any suitable dimension may be used for the petals, mild sheet steel three-sixteenths of an inch in thickness has been found to be suitable. Each petal 14 has a center flange 42 attached to the center disk 12. The center flange 42 allows the petal 14 to move in a vertical direction 40 due to flexure of the center flange 42 and to a lesser extent flexure of the remainder of the petals 14. Dashed lines on FIG. 3 show an alternate position of petal 14 due to flexure of petal 14 in response to a change in contour of driveway surface 6. As the petal 14 rotates around the turntable 2, the flexible center flange 42 allows each petal 14 to rise or fall with respect to the center disk 12 in conformance to an uneven ground surface 6.

Figure 5:
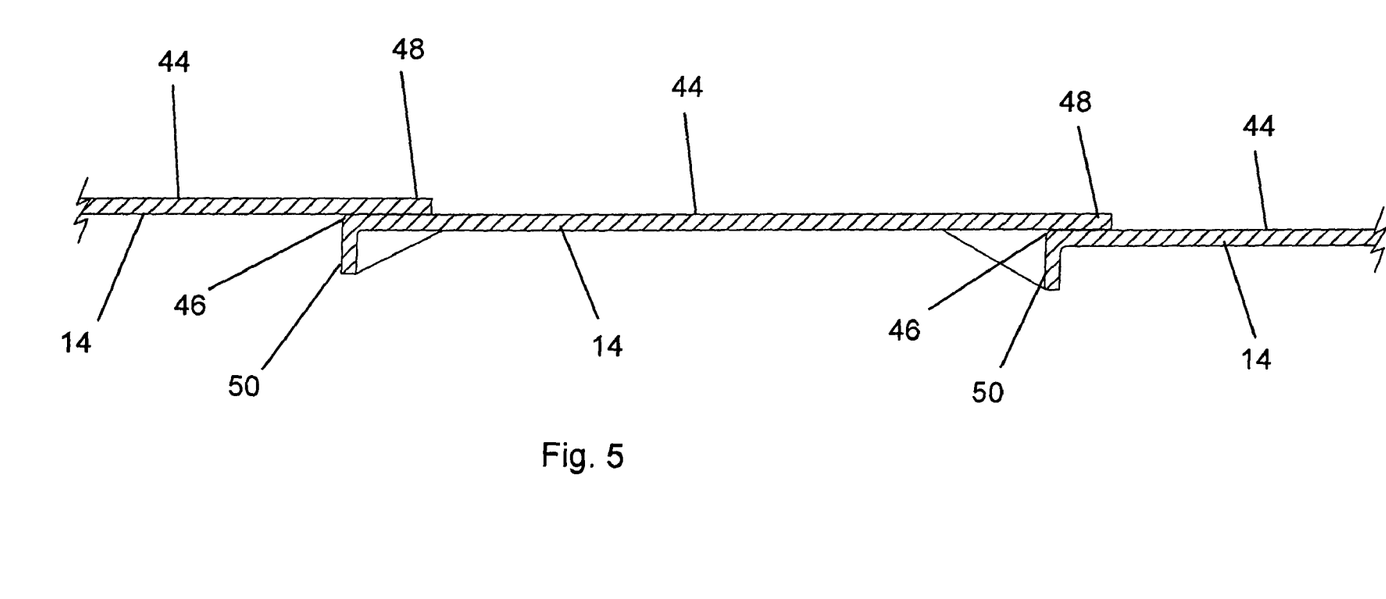
FIG. 5 is section B—B from FIG. 2.

Each petal 14 is able to move in a vertical direction 40 with minimum interference from adjoining petals 14 due to the structure of the petals 14 and the relationship of the petals 14 one to another. FIG. 5 shows cross section B—B from FIG. 2. As shown by FIG. 4, each petal 14 has an upper surface 44, a first radial edge 46 and a second radial edge 48. Reinforcing flange 50 depends from the first radial edge 46. Reinforcing flange 50 acts as a radial structural reinforcement for the petal 14 and hence for turntable deck 8. The reinforcing flange 50 supports a load placed on the petal, such as the weight of an automobile 4, and transmits the load to the center disk 12 (and hence to the inner rollers 32 supported by the base 30) and to the outer rollers 38 mounted on the underside of the petal 14 (and hence to the track 10). The reinforcing flange 50 renders the reinforced first radial edge 46 of the petal 14 relatively rigid in the radial direction.

The second radial edge 48 of each petal 14 is generally coplanar with the upper surface 44 of the petal 14 and has no reinforcing flange 50. The second radial edge 48 of each petal 14 overlaps and is supported by the first radial edge 46 of the adjoining petals 14. The first and second radial edges 46, 48 of adjoining petals 14 are joined at a single point 52 (FIG. 2). The structure of each petal allows the outer end 18 of the petal 14 to twist with respect to the inner end 16 of the petal 14. Because each petal 14 can twist along its length, the first radial edge 48 of each petal 14 is able to follow the contours of a driveway surface 6 without interfering with an adjoining petal 14.

Figure 6:
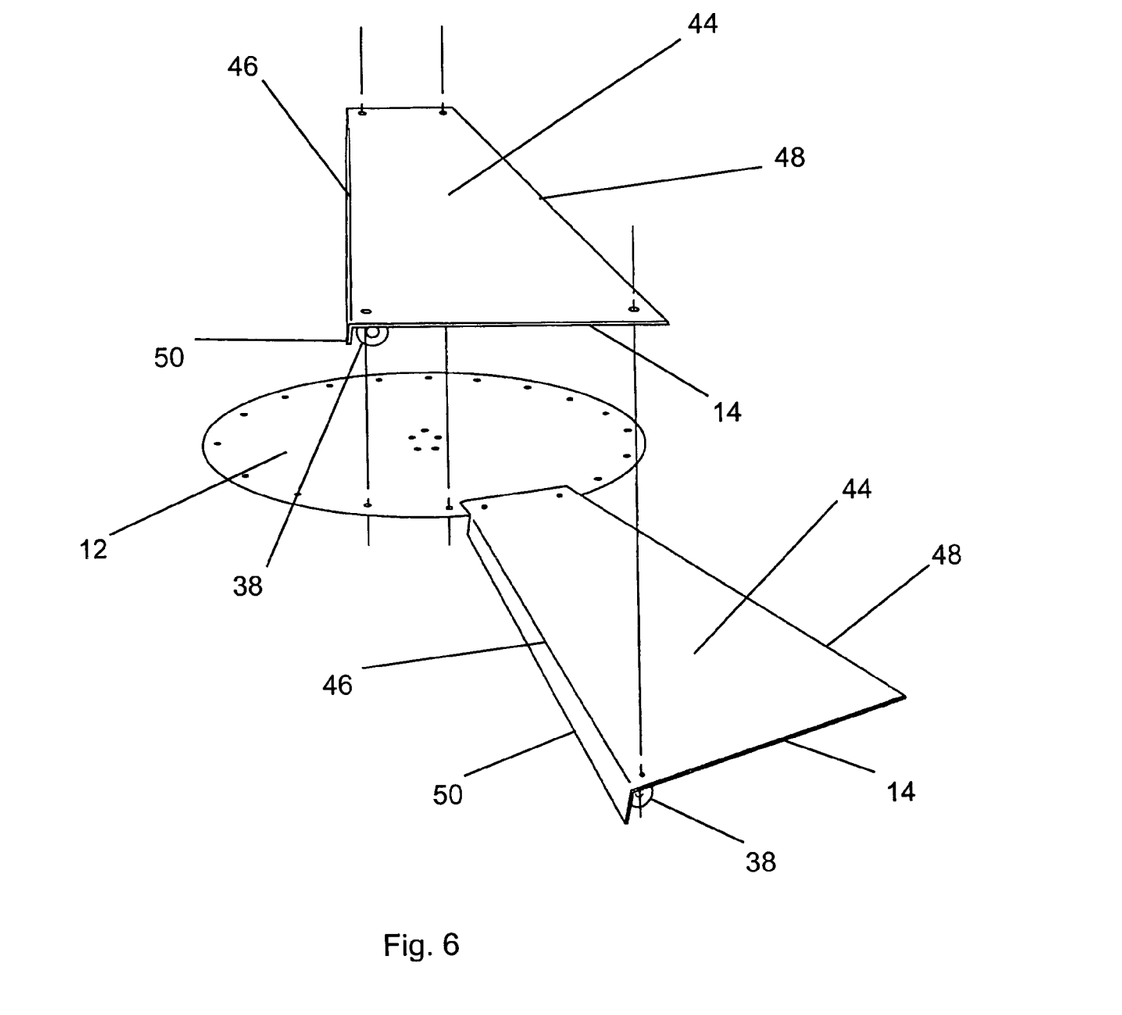
FIG. 6 is detail exploded view.

The construction of the turntable deck 8 is further illustrated by FIG. 6, which is a detail exploded view of two petals 14 and the center disk 12. FIG. 6 illustrates that the second radial edge 48 of a petal 14 overlaps the first radial edge 46 of an adjoining petals 14. The reinforcing flange 50 of the first radial edge 46 therefore supports the second radial edge 48 of the adjoining petals 14.

The lip portion 36 (FIGS. 3, 4) of the two petals 14 illustrated by FIG. 6 is omitted to make visible outer rollers 38 that are mounted to petals 14 adjacent to reinforcing flange 50. Outer rollers 38 support the first radial edge 46 of each petal 14. Each petal 14 is joined to the adjacent petal 14 at a single point 52. Each petal 14 is relatively flexible and able to twist along its length due to the flexure of the un-reinforced sheet steel from which the petal is fabricated, allowing the first radial edge 46 of each petal 14 to rise and fall as the outer roller 38 supporting the first radial edge 46 follows the contour of the driveway surface 6.

Figure 7:
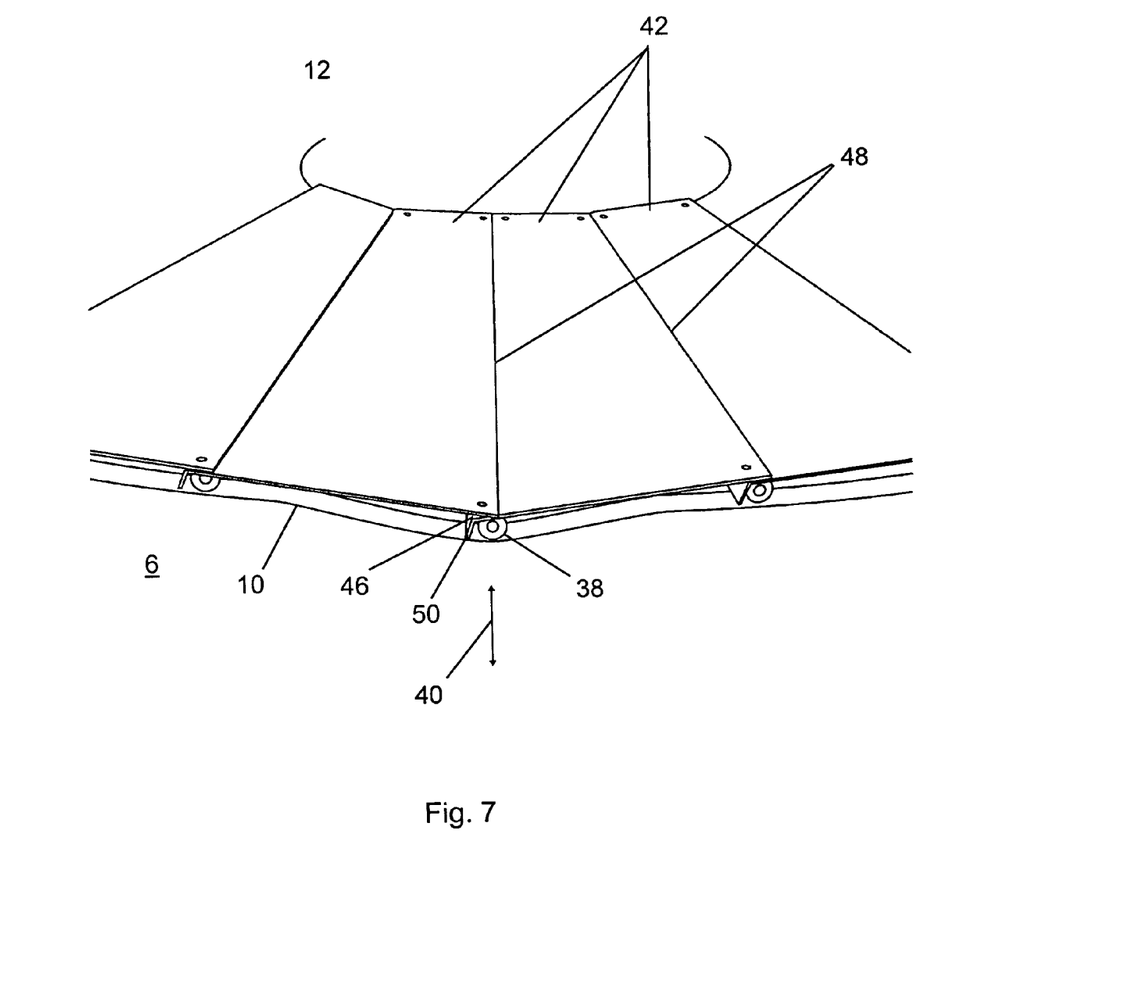
FIG. 7 is a schematic perspective view.

FIG. 7 is an exaggerated schematic diagram showing the operation of the turntable 2 on an uneven driveway surface 6. Lip portion 36 (FIG. 3) is again omitted to make visible the operation of the outer rollers 38. As the turntable 2 rotates, an outer roller 38 rises and falls in a vertical direction 40, following the changing contours of the track 10 as it rests on the uneven driveway surface 6. The outer roller 38 supports the first radial edge 46 of a petal 14, which first radial edge 46 is reinforced with the reinforcing flange 50. The first radial edge 46 rises and falls with outer roller 38, the central flange flexing to allow the vertical movement. The petal 14 flexes and twists along its length, allowing the petal 14 to follow the contours of the track 10 with minimal interference from the adjoining petals 14.

Figure 8:
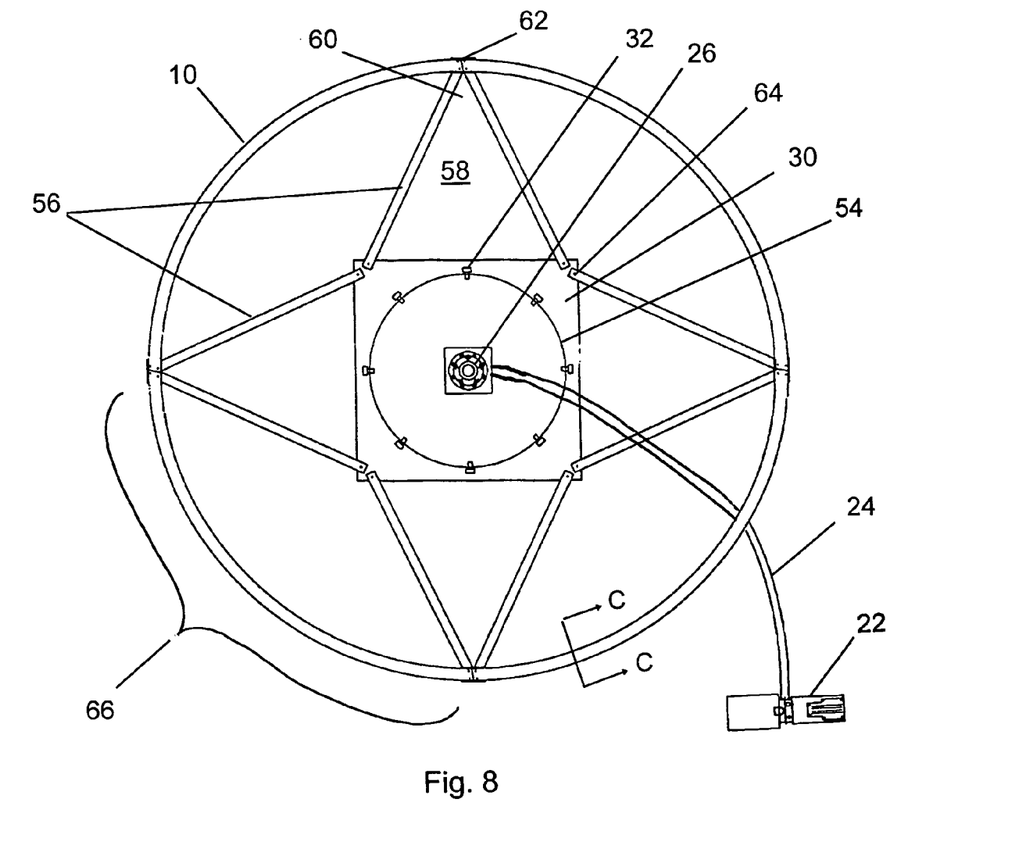
FIG. 8 is plan view of the turntable with the deck removed.

FIG. 8 is a plan view of the turntable 2 with the deck 8 removed. Hydraulic pump 22 provides hydraulic fluid under pressure to hydraulic lines 24, which in turn feed hydraulic gear motor 26 inside motor enclosure 28 (FIGS. 3,4). The motor enclosure 28 is attached to base 30.

The hydraulic gear motor 26 extends through base 30 and is bolted to center disk 12. Inner rollers 32 are attached to a generally circular inner roller frame 54 attached to the base 30. Inner roller frame 54 both supports inner rollers 32 and stiffens base 30. As described above, inner rollers 32 support center disk 12.

Pairs of locating bars 56 are attached to base 30. Each pair of locating bars 56 joins to base 30 to define a triangle 58. Each triangle 58 has an apex 60. A splice plate 62 is mounted at each apex 60. Track sections 66 attach to splice plates 62. Each locating bar 56 is of a fixed length and the mounting positions 64 on base 30 are fixed; the locations of splice plates 62 for track 10 therefore are fixed. FIG. 7 illustrates a turntable 2 with four pairs of locating bars 56 and hence with four splice plates 62. Alternatively, any whole number of pairs of locating bars 56 may be used.

Locating bars 56 are composed of a material that is adequately strong in a lateral direction to adequately locate splice plates 62. The locating bars 56 are relatively flexible in the vertical direction 40, allowing the locating bars 56 to generally conform to the contour of the driveway surface 6 while still accurately locating the track 10. Type 304 stainless steel one-eighth on an inch thick has proved suitable for locating bars 56.

The track 10 is generally circular and attaches to splice plates 62. Arcuate track sections 66 are joined one to another to form the circular track 10. As used in this application, the term "arcuate" means curved to form a portion of a circle. Each track section attaches to two splice plates 62, which define the starting and ending points for each track section 66. The number of track sections 66 corresponds to the number of splice plates 62. FIG. 8 illustrates a track 10 consisting of four track sections 66, but any number of track sections 66 may be employed.

Figure 9:
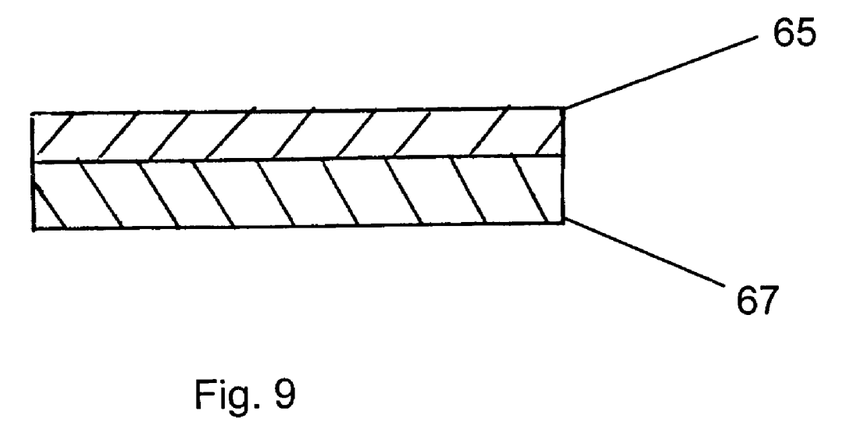
FIG. 9 is cross section C—C from FIG. 8.

The track 10 is relatively flexible in the vertical direction 40, allowing track 10 to generally conform to the contours of driveway surface 6. The track 10 is adequately strong to bridge local discontinuities such as bumps and depressions in the driveway surface 6. Outer rollers 38 roll on the track 10 and the track 10 bears the majority of the weight of the automobile 4 when the turntable 2 is in operation. As shown by FIG. 9, which is cross section C—C of FIG. 8, track 10 is a composite of a structural upper portion 65 bonded to a resilient lower portion 67. The structural upper portion 65 of the track 10 is adequately strong to bear the weight of the automobile 4 transmitted by the outer rollers 38 without excessive wear and to bridge local discontinuities in the surface 6 of the driveway. Laser cut type 304 stainless steel one quarter of an inch thick is adequate for the structural upper portion 65 of track 10 and is rust resistant.

The resilient lower portion 67 allows track 10 to move slightly in response to pressure exerted on track 10 by outer rollers 38, distributing the load presented by an outer roller 38 across the full width of the outer roller 38. The resilient lower portion 67 therefore reduces premature wear of track 10. Resilient lower portion 67 also acts to cushion track from minor local discontinuities. Rubber has proven to be a suitable resilient lower portion 67.

Figure 10:
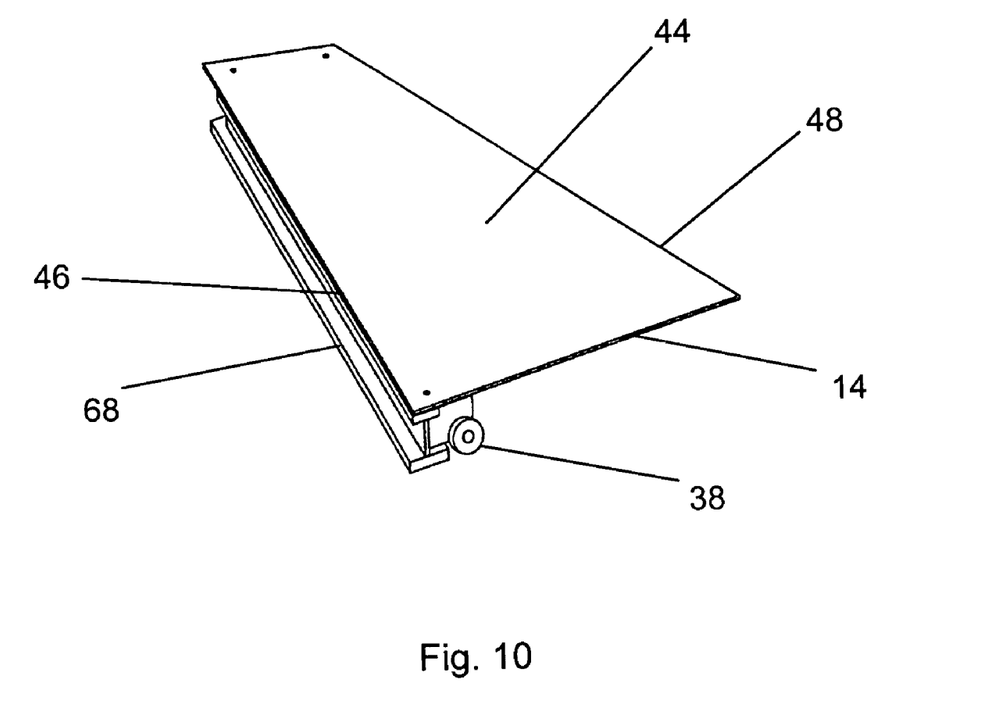
FIG. 10 is an alternative embodiment of a petal.

FIG. 10 illustrates an alternative embodiment petal 14. While the reinforcing flange 50 and the upper surface 44 of the petal 14 may be formed of a single piece of a strong, thin material such as sheet steel, the reinforcement also may be a separate component. As used in this application, the term "reinforcement" means any structure attached to or formed in a petal 14 to strengthen the petal in the radial direction. In FIG. 10, the reinforcement for the first radial edge 46 of petal 14 is I-beam 68 attached to first radial edge 46 of petals 14. Any other suitable reinforcement also may be used to provide structural support for the first radial edge 46 of petals 14.

Figure 11:
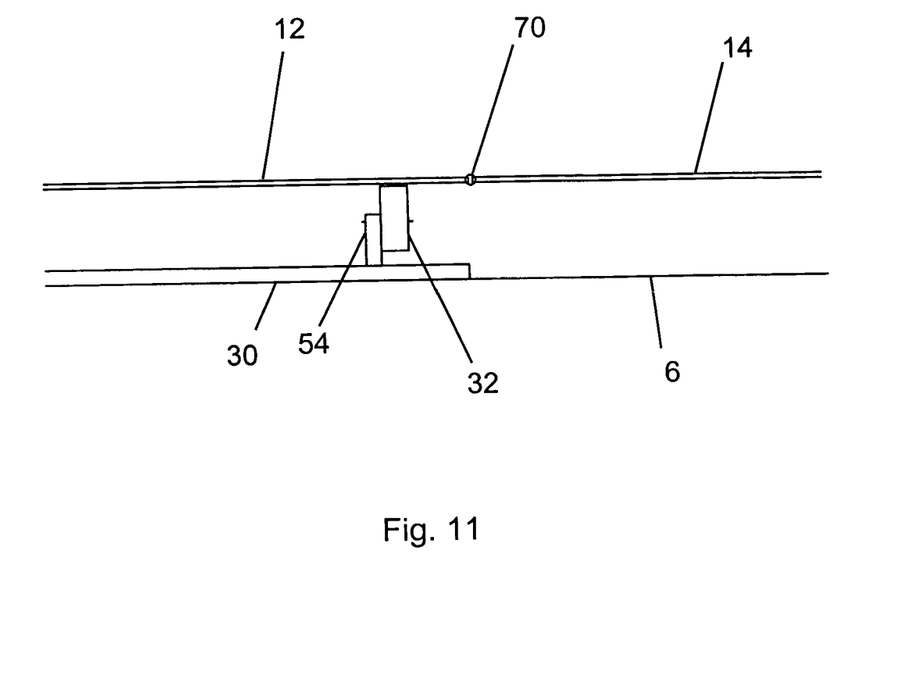
FIG. 11 is an alternative connection of a petal to the center disk.

FIG. 11 provides an alternative embodiment for the connection of petal 14 to center disk 12. FIG. 11 is a detail cross section of that connection. In FIG. 11, the connection between petal 14 and center disk 12 is a hinged connection using hinge 70, rather than a connection depending upon the flexure of center flange 42, as shown by FIG. 3.

Figure 12:
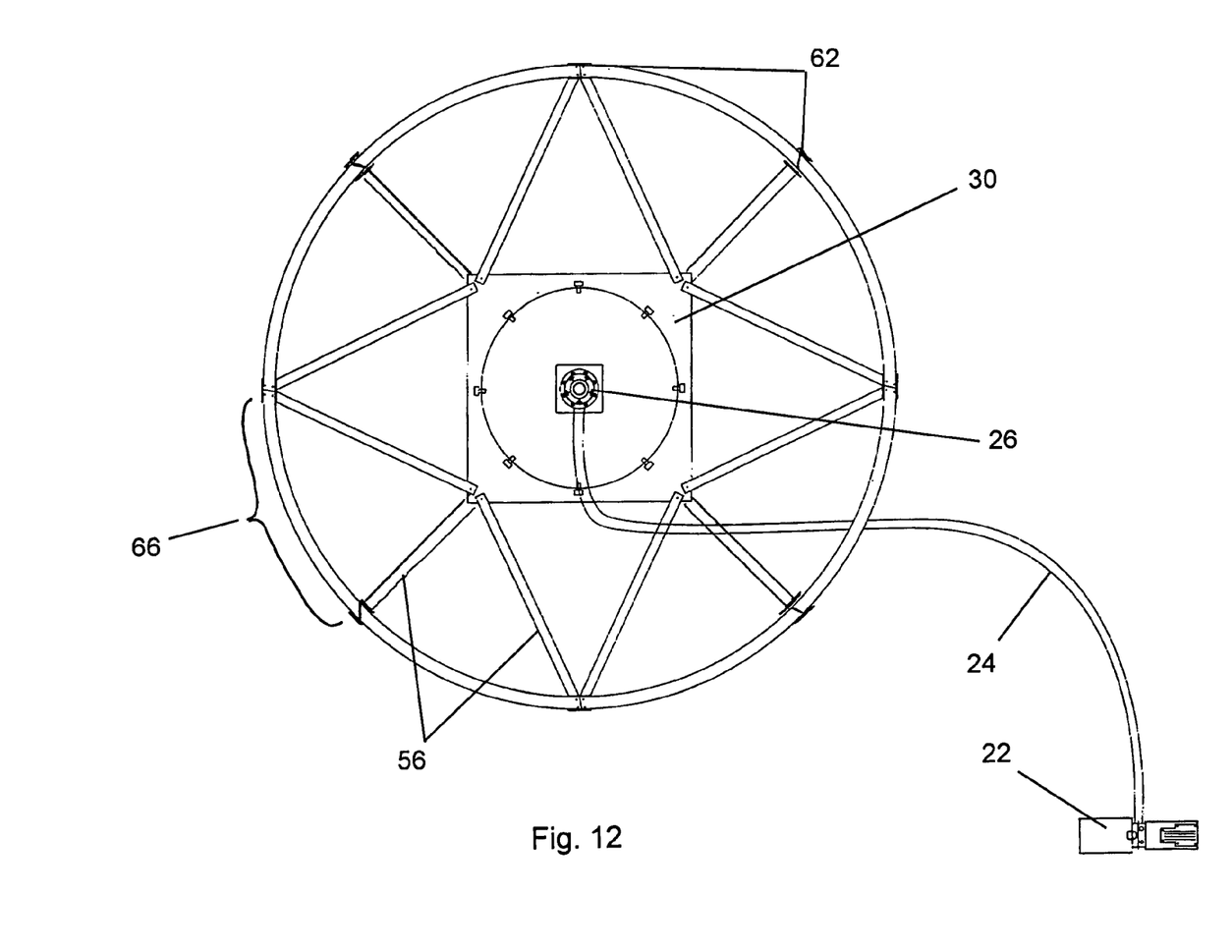
FIG. 12 is an alternative arrangement of locating bars.

FIG. 12 provides an alternative embodiment for locating bars 56. In the alternative embodiment of FIG. 12, eight track sections 66 and twelve locating bars 56 are utilized. One end of each track section 66 is anchored to a splice plate 62. Each track section 66 therefore is prevented from moving in an angular direction with respect to the base 30. The other end of each track section 66 is located by a single locating bar 56 and by the adjoining track section 66. The movement of each track section 66 therefore is fully controlled. The locating bars 56 arrangement of FIG. 12 is particularly applicable to a relatively large turntable 2 having a corresponding large track 10 diameter. Eight small track sections 66 may be used rather than four large track sections 66 for ease of transportation and construction.

Figure 13:
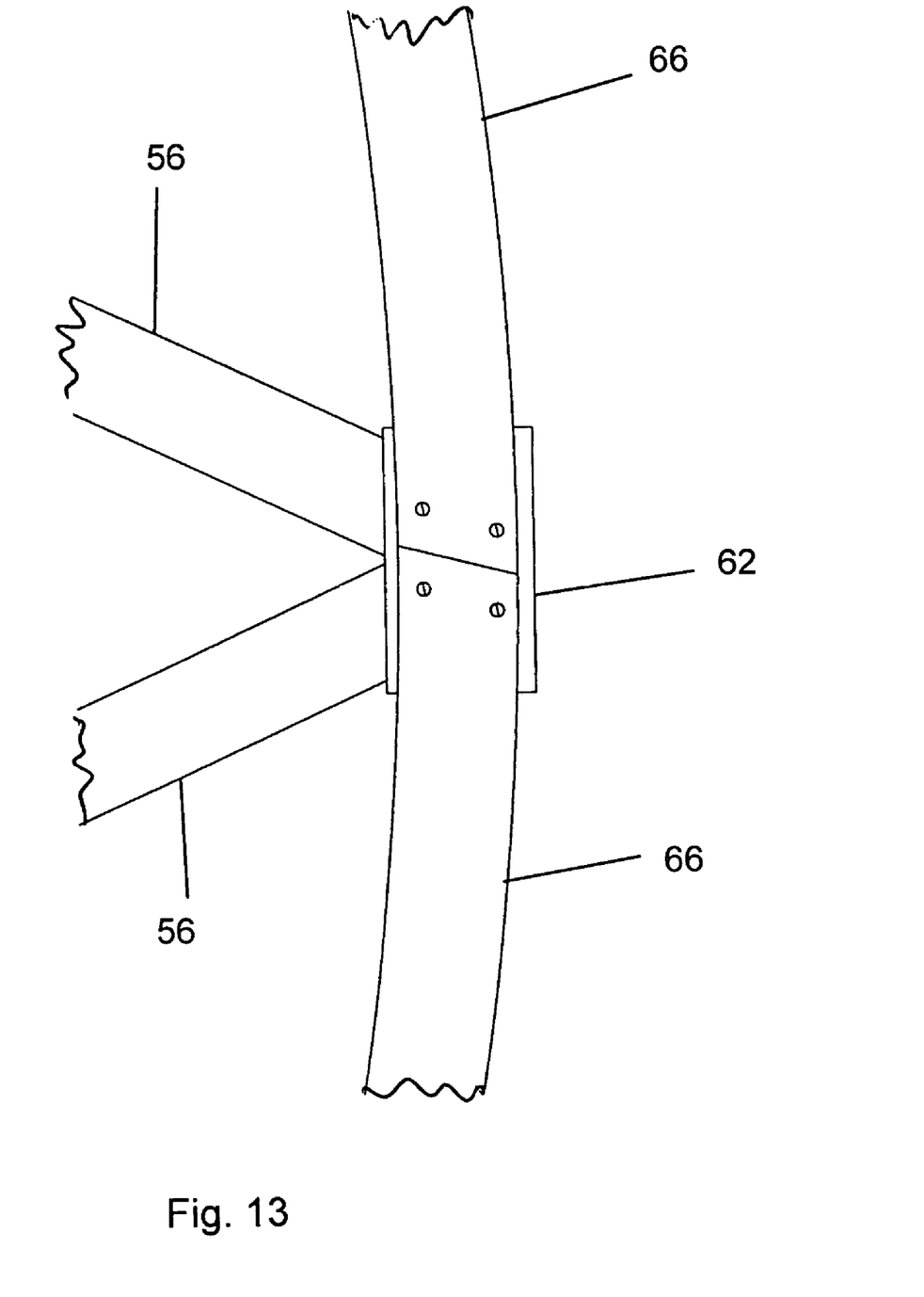
FIG. 13 is a detail of a splice plate.

FIG. 13 is a detail of a splice plate 62, track sections 66 and locating bars 56. Track sections 66 are bolted to splice plates, securing track sections 66 one to another and to locating bars.

Figure 14:
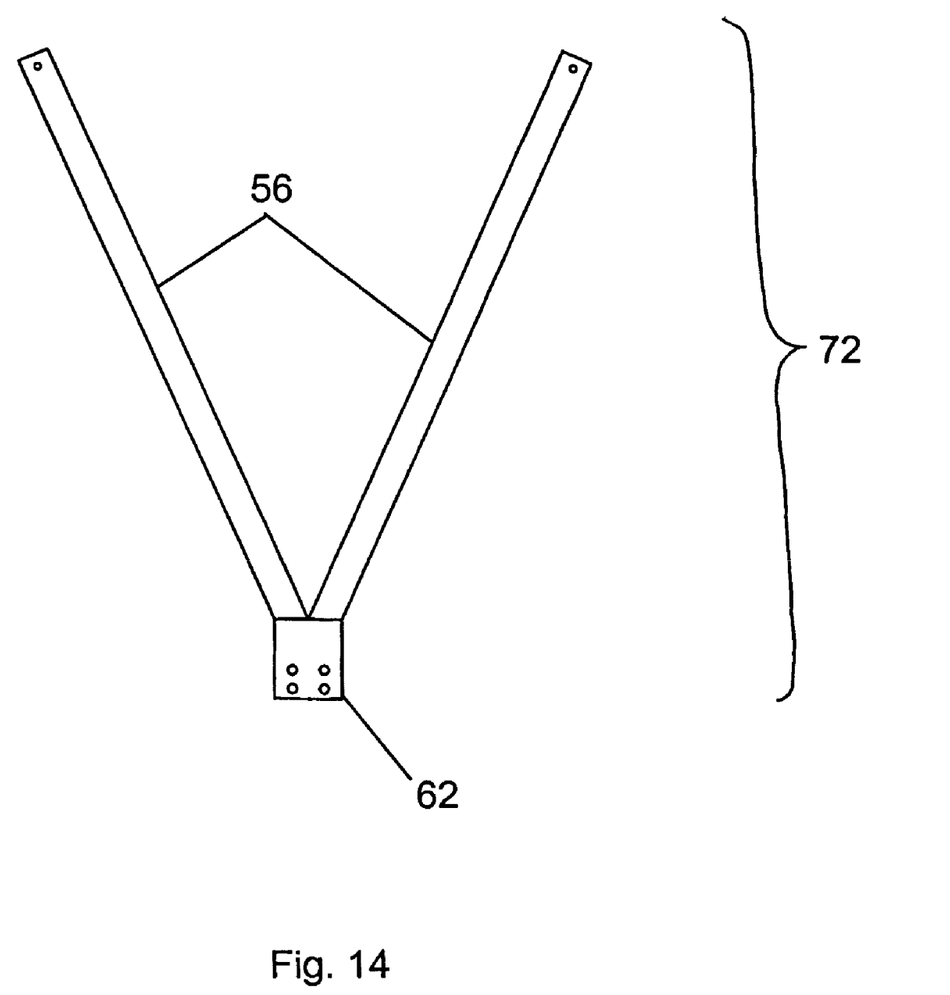
FIG. 14 is a detail of a V-bar.

As an additional alternative embodiment illustrated by FIG. 14, pairs of locating bars 56 may be fabricated along with a splice plate 62 as a single V-bar 72. The V-bar 72 is attached to base 30, forming triangle 58. Track sections 66 attach to splice plate 62. Type 304 stainless steel ⅛ inch thick is suitable for V-bar 72 and for splice plate 62 and locating bars 56.

In use, the maximum pressure exerted by the hydraulic pump 22 is adjusted by user so that the hydraulic gear motor 26 exerts sufficient torque to rotate the turntable 2 and the automobile 4 that the turntable 2 is intended to rotate, but the maximum pressure will be maintained at an adequately low level so that the turntable 2 will stop turning if the turntable 2 or the automobile 4 on the turntable 2 encounters an obstacle, such as another automobile parked too close to the turntable 2. A maximum pressure of 400 psi has proven adequate to rotate a turntable 2 and a family automobile 4.

The turntable 2 may be packaged and marketed as a kit for installation by a homeowner. The compact size of the parts of the kit provide for ease of shipment and ease of erection by the homeowner. While the track 10, deck 8 and locating bars 56 may conform generally to the surface 6 of a driveway and may bridge some local discontinuities, the turntable 2 cannot conform to all driveway surfaces 6. It may be necessary for a homeowner to remove driveway areas that are excessively high or to fill areas that are excessively low.

The turntable 2 is discussed above in terms of an automobile turntable 2. The turntable 2 is not limited to automobiles 4 and may be used for any purpose.

In describing the above embodiments of the invention, specific terminology was selected for the sake of clarity. However, the invention is not intended to be limited to the specific terms so selected, and it is to be understood that each specific term includes all technical equivalents that operate in a similar manner to accomplish a similar purpose.

What is claimed is:

1. An automobile turntable comprising:
   a. a center disk;
   b. a plurality of petals attached to said center disk, said center disk and said plurality of petals together defining a turntable deck;
   c. a plurality of outer rollers attached to said plurality of petals;
   d. a track, said plurality of outer rollers rotatably engaging said track and supporting said turntable deck; and
   e. a motor adapted to selectably rotate said turntable deck, wherein each of said petals has a first radial edge and a second radial edge, each of said first radial edges having a reinforcement, each of said second radial edges not having a reinforcement, said reinforcement of said first radial edges comprising each of said petals having a reinforcing flange depending from said first radial edge, and wherein said first radial edge of each of said petals engages and supports said second radial edge of an adjoining said petal.

2. The turntable of claim 1 wherein said engagement and support of said second radial edge of said adjoining said petal by said first radial edge comprising said second radial edge of said adjoining said petal overlapping said first radial edge.

3. The turntable of claim 2 wherein said attachment between each of said petals and said center disk comprising each of said petals having a center disk flange, each of said center disk flanges being attached to said center disk, each of said center disk flanges being adapted to flex in a vertical direction thereby allowing each of said petals to rotate in a vertical direction over a pre-selected range.

4. The turntable of claim 3 wherein each of said petals is formed from a single piece of a sheet metal.

5. The turntable of claim 4 wherein each of said petals has a lip portion.

6. The turntable of claim 5, further comprising:
   a. a base;
   b. a plurality of pairs of locating bars, each of said locating bars being of fixed length, each of said pairs of locating bars cooperating with said base to form a triangle, said track having a plurality of sections, each of said plurality of sections of said track being attached to at least one of said triangles.

7. The turntable of claim 6, further comprising: a hydraulic pump, said hydraulic pump having a user-selectable maximum pressure, said motor comprising a hydraulic gear motor connected to and powered by said hydraulic pump, said hydraulic gear motor being attached to said base and rotatably connected to said center disk.

8. The turntable of claim 7 wherein said track comprises an upper structural portion rotatably engaging said plurality of outer rollers, said track further comprising a lower resilient portion engaging and supporting said upper structural portion.

9. An automobile turntable comprising:
   a. a plurality of arcuate track sections, each of said track sections being joined to two other track sections to form a generally circular track;
   b. a plurality of pairs of locating bars;
   c. a base, each of said plurality of pairs of locating bars and said base cooperating to define a plurality of triangles, each of said plurality of arcuate track sections being connected to at least one of said triangles;
   d. a deck rotatably engaging said track, wherein said track is adapted to be supported by a surface, said surface having a contour, each of said plurality of locating bars and each of said track sections being adapted so that each of said track sections conforms generally to said contour of said surface, each of said plurality of locating bars is of a fixed length, each of said track sections comprises an upper structural portion and a lower resilient portion.

10. The turntable of claim 9, wherein said deck comprises a plurality of petals, each of said petals rotatably engaging said track, each of said petals being connected to two others of said petals, each of said petals being adapted to move in a vertical direction with respect to each of the two adjoining petals to allow said deck to conform to said track and hence to said contour of said surface.

11. The turntable of claim 10 wherein each of said petals having an inner end, an outer end, an upper surface, a first radial edge and a second radial edge, said adaptation of each of said petals to move in a vertical direction comprising:
   a. each of said petals having a reinforcing flange depending from said upper surface at said first radial edge;
   b. said inner end of each of said petals being flexibly attached to said center disk;

c. said second radial edge of said petals being generally coplanar with said upper surface and having no reinforcement, said second radial edge overlapping and being supported by said first radial edge of an adjoining said petal.

12. The turntable of claim 11 wherein the upper surface, first radial edge, second radial edge and reinforcing flange of each of said petals consisting of a single piece of a sheet metal.

13. The turntable of claim 12, further comprising: a hydraulic gear motor attached to said deck and a hydraulic pump hydraulically connected to said hydraulic gear motor, said hydraulic pump having a user selectable maximum pressure.

14. A turntable comprising:
  a. a deck;
  b. a roller having a width, said roller rotatably attached to said deck;
  c. a track, said track engaging and generally conforming to a surface, said roller rotatably engaging and adapted to apply a load to said track;
  d. means for moving said track with respect to said roller so that said width of said roller engages said track thereby preventing premature wear of said track, wherein said means for moving said track comprises said track having an upper structural portion and a lower resilient portion, said upper structural portion engaging said roller, said lower resilient portion engaging said surface, said lower resilient portion being adapted to resiliently deform in response to said load placed on said upper structural portion by said roller thereby distributing a load presented to said track by said roller across said width of said roller.

* * * * *